United States Patent
Kim

(10) Patent No.: US 7,274,166 B2
(45) Date of Patent: Sep. 25, 2007

(54) APPARATUS AND METHOD FOR CORRECTING POSITION OF MOBILE ROBOT

(75) Inventor: Young-Gie Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/921,912

(22) Filed: Aug. 20, 2004

(65) Prior Publication Data

US 2005/0134209 A1 Jun. 23, 2005

(30) Foreign Application Priority Data

Dec. 22, 2003 (KR) ............... 10-2003-0094954

(51) Int. Cl.
*B25J 19/02* (2006.01)
*B25J 5/00* (2006.01)

(52) U.S. Cl. ............... 318/568.12; 318/647; 318/653; 901/46

(58) Field of Classification Search ......... 318/567, 318/568.1, 568.11, 568.12, 647, 652, 653; 901/46; 700/245, 254, 258
See application file for complete search history.

(56) References Cited

U.S. PATENT DOCUMENTS

| | | | | |
|---|---|---|---|---|
| 3,653,456 A | * | 4/1972 | Uemura ............... | 180/168 |
| 4,554,498 A | * | 11/1985 | Fujiwara et al. ........ | 318/640 |
| 4,790,402 A | * | 12/1988 | Field et al. ........... | 180/169 |
| 4,798,267 A | | 1/1989 | Foster et al. | |
| 4,990,841 A | * | 2/1991 | Elder ................. | 318/587 |
| 5,165,064 A | * | 11/1992 | Mattaboni ............. | 356/141.2 |
| 5,204,814 A | | 4/1993 | Noonan et al. | |
| 5,279,672 A | | 1/1994 | Betker et al. | |
| 5,341,540 A | | 8/1994 | Soupert et al. | |
| 5,440,216 A | | 8/1995 | Kim | |
| 5,446,356 A | * | 8/1995 | Kim ................. | 318/587 |
| 5,646,494 A | | 7/1997 | Han | |
| 5,650,702 A | * | 7/1997 | Azumi ............... | 318/587 |
| 6,308,118 B1 | * | 10/2001 | Holmquist ............ | 701/23 |
| 6,463,360 B1 | * | 10/2002 | Terada et al. ......... | 700/257 |
| 6,496,754 B2 | | 12/2002 | Song et al. | |
| 6,549,004 B1 | * | 4/2003 | Prigge ............... | 324/207.17 |
| 6,841,963 B2 | * | 1/2005 | Song et al. .......... | 318/568.12 |

(Continued)

FOREIGN PATENT DOCUMENTS

JP 5-502743 5/1993

(Continued)

OTHER PUBLICATIONS

English Language Abstract of RU 22210492.

(Continued)

*Primary Examiner*—Bentsu Ro
(74) *Attorney, Agent, or Firm*—Greenblum & Bernstein, P.L.C.

(57) ABSTRACT

An apparatus and a method for correcting a position of a mobile robot includes a position notifying unit, installed at a predetermined position, that generates and transmits a signal indicative of the predetermined position. The mobile robot includes a position signal detector, installed at a predetermined position of the mobile robot, that detects a signal; and a control unit, installed at a predetermined position of the mobile robot, that corrects a position of the mobile robot on the basis of pre-stored position information corresponding to the detected position signal, so that a position error that is generated when the mobile robot moves is corrected.

20 Claims, 3 Drawing Sheets

U.S. PATENT DOCUMENTS

| | | | | |
|---|---|---|---|---|
| 6,850,024 | B2* | 2/2005 | Peless et al. | 318/580 |
| 6,925,358 | B2* | 8/2005 | Chiu | 700/245 |
| 2002/0091466 | A1 | 7/2002 | Song et al. | |
| 2003/0236590 | A1* | 12/2003 | Park et al. | 700/245 |

FOREIGN PATENT DOCUMENTS

| | | |
|---|---|---|
| JP | 5-189032 | 7/1993 |
| JP | 6-04125 | 1/1994 |
| JP | 7-225613 | 8/1995 |
| JP | 2001-125640 | 5/2001 |
| JP | 2003-315003 | 11/2003 |
| KR | 2003-80436 | 10/2003 |
| RU | 2210492 | 3/2003 |

OTHER PUBLICATIONS

English language Abstract of Korean 2003-80436.
An English language Abstract of Japanese Patent Publication No. 2001-125640.
An English language Abstract of Japanese Patent Publication No. 5-189032.
An English language Abstract of Japanese Patent Publication No. 7-225613.
An English language Abstract of Japanese Patent Publication No. 6-04125.
An English language Abstract of Japanese Patent Publication No. 2003-315003.
An English language Abstract of Japanese Patent Publication No. 5-502743.

* cited by examiner

APPARATUS AND METHOD FOR CORRECTING POSITION OF MOBILE ROBOT

BACKGROUND OF THE INVENTION

1. Field of the Invention

The present invention relates to a mobile robot, and particularly, to an apparatus and a method for correcting a position of a mobile robot.

2. Description of the Background Art

In general, a mobile robot, particularly, a robot cleaner means a device for automatically cleaning an area to be cleaned by sucking foreign substances such as dust or the like from a floor while moving along a wall surface of a room of a house (e.g., living room, inner room or the like) by itself without any manipulation of a user.

The robot cleaner determines a distance between itself and an obstacle such as furniture, office supplies, wall or the like installed in an area to be cleaned through a distance sensor. According to the determined distance, the robot cleaner selectively drives a motor for driving its left wheel and a motor for driving its right wheel, thereby switching its direction by itself and cleaning a cleaning area. Here, the robot cleaner performs a cleaning operation, moving in the cleaning area through map information stored at an internal storing unit.

Hereinafter, mapping for generating the map information will now be described.

First, the robot cleaner moves along a side surface of an operation space (e.g., a wall surface of a living room of a house), to calculate a distance and a direction from itself to a charging station installed at a wall, and scans an operation space, determining its position on the basis of the calculated distance value and direction value. Here, the robot cleaner detects its current position by using an encoder installed at its wheel.

The robot cleaner determines whether there is an obstacle between itself and the charging station. If there is no obstacle, the robot cleaner scans an operation space by transmitting/receiving a signal to/from the charging station. On the other hand, if there is an obstacle between the robot cleaner and the charging station, the robot cleaner scans another operation space, first. Then, when the obstacle is gone, the robot cleaner scans the operation space where the obstacle has been gone, transmitting/receiving a signal to/from the charging station.

However, the method for detecting a position of the robot cleaner by using the encoder has a problem that an error is generated because of sliding of the wheel or idle rotation since a current position of the robot cleaner is searched by using the encoder installed at its wheel.

In a method for detecting a position of a robot cleaner in accordance with a different conventional art, stickers or reflection plates having the same shape are installed in an operation area (e.g., a wall surface of a living room of a house) at prescribed intervals, and the robot cleaner recognizes the stickers or the reflection plates by using a CCD camera to thereby correct an error generated by the sliding of the wheel and the idle rotation and thus recognizes a distance between itself and a charging station. However, the method for detecting the position of the robot cleaner by using the sticker or the reflection plate has a problem that a distance error is accumulated when illumination brightness of a cleaning operation area is changed, or a subject having a shape similar to the sticker or the reflection plate is recognized.

In addition, if the illumination brightness becomes lower or higher than a threshold, the robot cleaner cannot check its position since a CCD (charge-coupled device) camera cannot recognize the sticker or the reflection plate. Also, since the CCD camera has to be installed at the robot cleaner, a fabrication cost of the robot cleaner is increased.

Technologies about a robot cleaner in accordance with a conventional art are disclosed in U.S. Pat. No. 5,440,216 and No. 5,646,494, which have been issued.

SUMMARY OF THE INVENTION

Therefore, an object of the present invention is to provide an apparatus and a method for correcting a position of a mobile robot capable of correctly correcting a position error generated when a mobile robot moves, by receiving a position signal notifying a predetermined position of a cleaning area and correcting current position information of a mobile robot on the basis of pre-stored position information corresponding to the received position signal.

To achieve these and other advantages and in accordance with the purpose of the present invention, as embodied and broadly described herein, there is provided an apparatus for correcting a position of a mobile robot comprising: a position notifying means installed at a predetermined position of a specific area, for generating a position signal notifying the predetermined position; a position signal detecting means installed at a predetermined position of a mobile robot, for detecting the position signal; and a control means installed at a predetermined position of the mobile robot, for correcting a position of the mobile robot on the basis of pre-stored position information corresponding to the detected position signal.

To achieve these and other advantages and in accordance with the purpose of the present invention, as embodied and broadly described herein, there is provided a method for correcting a position of a mobile robot comprising: generating a position signal for notifying a predetermined position of a specific area; detecting the position signal; and correcting a position of the mobile robot on the basis of pre-stored position information corresponding to the detected position signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Hereinafter, a preferred embodiment of an apparatus and a method for correcting a position of a mobile robot capable of correctly correcting a position error generated when a mobile robot moves, by receiving a position signal notifying a predetermined position of a cleaning area and correcting current position information of a mobile robot on the basis of pre-stored position information corresponding to the received position signal, will now be described with reference to FIGS. 1 to 3.

Figure 1:
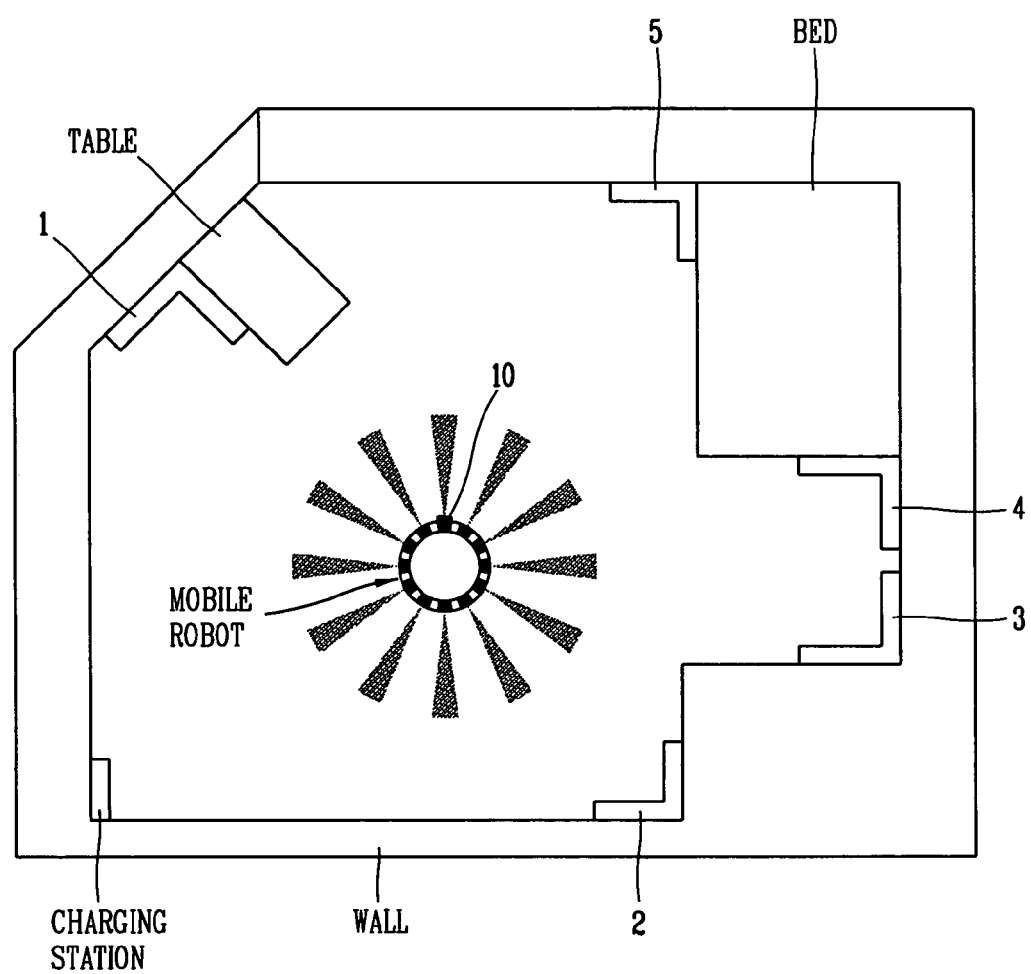
FIG. 1 is a schematic view showing a structure of an apparatus for correcting a position of a mobile robot in accordance with the present invention.

FIG. 1 is a schematic view showing a structure of an apparatus for correcting a position of a mobile robot in accordance with the present invention.

As shown therein, an apparatus for correcting a position of a mobile robot in accordance with the present invention includes at least one position notifying unit 1~5 installed at a predetermined position in a specific area such as a cleaning area (e.g., living room, room, office), for generating a position signal for notifying the predetermined position; a position signal detecting unit 10 installed at a predetermined position of the mobile robot, for detecting the position signal; and a control unit (not shown) installed at a predetermined position of the mobile robot, for correcting a position error generated when the mobile robot moves on the basis of pre-stored position information corresponding to the detected position signal.

Hereinafter, an operation of an apparatus for correcting a position of the mobile robot in accordance with the present invention will now be described in detail with reference to FIGS. 2 and 3.

Figure 2:
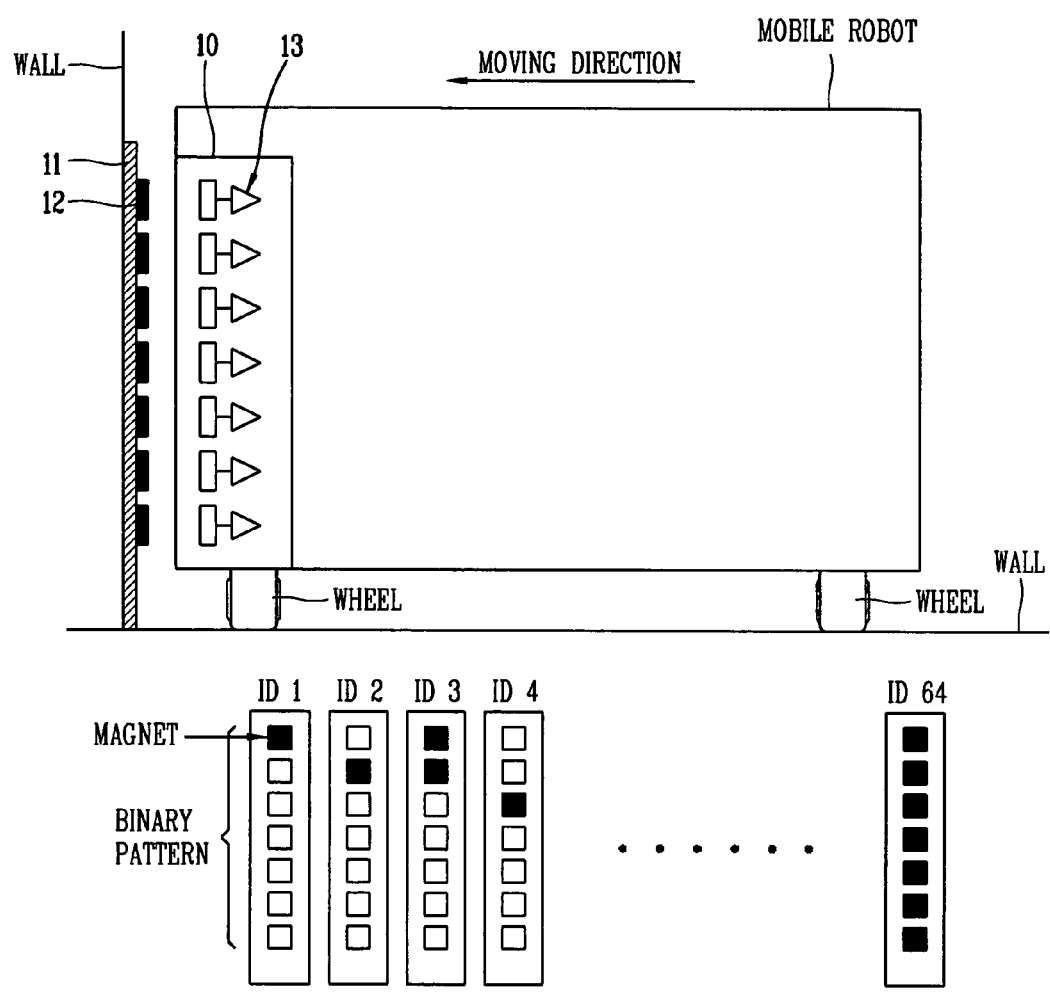
FIG. 2 is a construction view showing a position notifying unit and a position signal detecting unit in accordance with the present invention in detail.

FIG. 2 is a construction view showing a position notifying unit 1~5 and a position signal detecting unit 10 in accordance with the present invention.

As shown therein, the position notifying unit (e.g., a first position notifying unit 1) includes a magnet fixing station 11; and one or more permanent magnet 12 installed at the magnet fixing station 11 in a binary pattern. Here, one permanent magnet 12 or a plurality of permanent magnets may be installed, and the permanent magnet 12 is installed at the magnet fixing station 11 in a binary pattern in order to generate a magnetic field corresponding to a binary value. For example, assuming that the position notifying unit 1 is the first position notifying unit 1, a binary value, a position signal of the first position notifying unit 1 is '010', and seven permanent magnets may be installed at the magnet fixing station 11 (e.g., first to seventh positions) at regular intervals, the permanent magnet 12 is installed only at a second position of the magnet fixing station 11 not at the rest of positions (first and third to seventh positions).

The position detecting unit 10 includes a plurality of magnetic sensors 13 (e.g., seven magnetic sensors) detecting a magnetic field generated from the one or more permanent magnet 12, changing the detected magnetic field to an electrical signal ('1' or '0') and outputting the electrical signal. Here, a magnet sensor which detects the magnetic field outputs '1', and a magnet sensor which does not detect the magnetic field outputs '0'. In addition, the magnetic sensors are installed at the mobile robot, corresponding to the first~seventh positions. That is, the electrical signal ('1' and '0') is converted into a binary value by the control unit.

Figure 3:
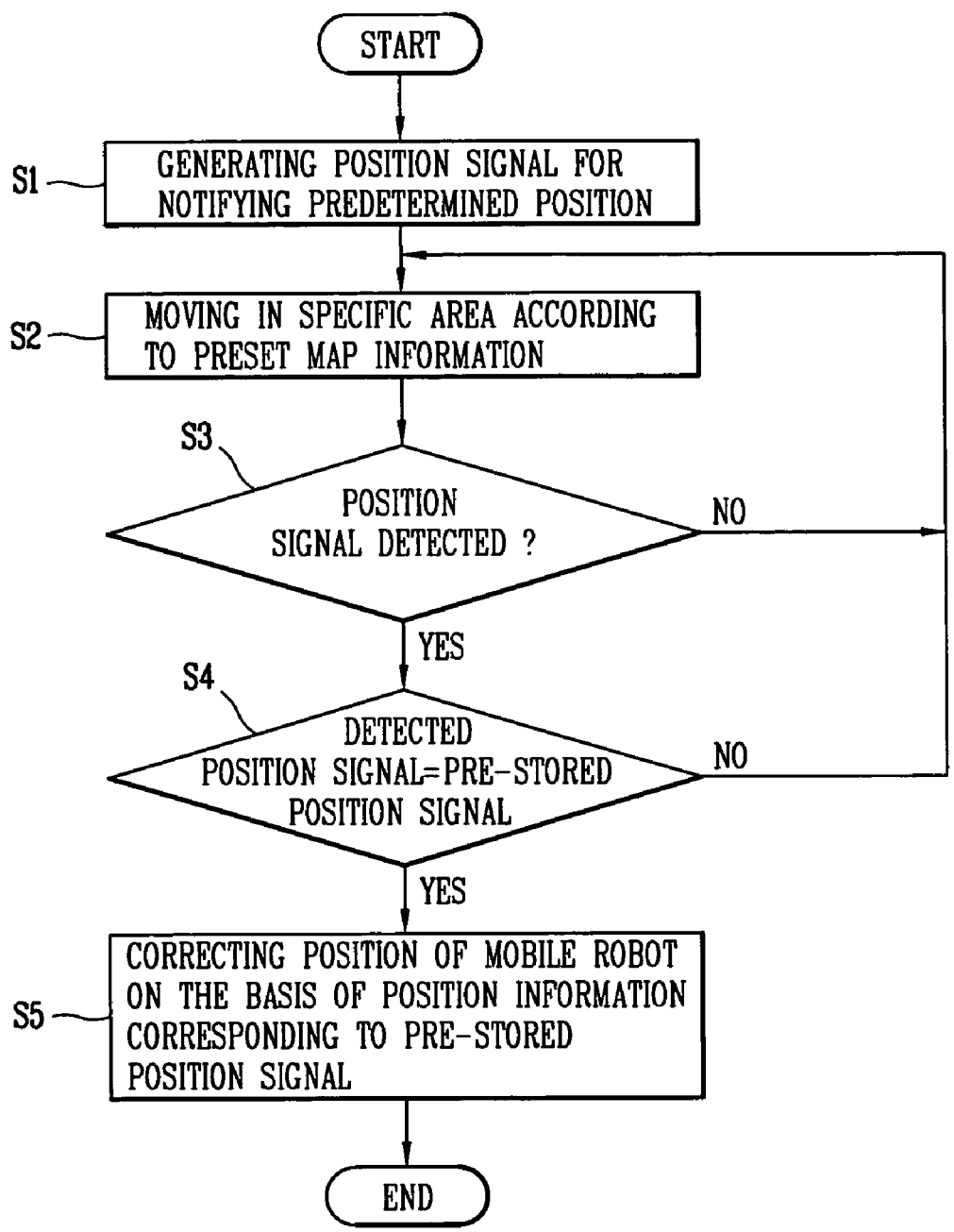
FIG. 3 is a flow chart showing a method for correcting a position of a mobile robot in accordance with the present invention.

FIG. 3 is a flow chart showing a method for correcting a position of a mobile robot in accordance with the present invention.

As shown therein, a method for correcting a position of a mobile robot in accordance with the present invention includes the steps of: generating a position signal for notifying a predetermined position of a specific area; detecting the position signal, moving the mobile robot in the specific area on the basis of preset map information; comparing the detected position signal and a pre-stored position signal; and correcting a current position error of the mobile robot on the basis of the comparison result.

First, the position notifying units 1~5 are installed at predetermined positions (e.g., wall) of a specific area such as a cleaning area (e.g., living room, room, office), and generate a position signal for notifying the predetermined position. Here, each position notifying unit includes a magnet fixing station 11 and one permanent magnet 12 or a plurality of permanent magnets 12 fixedly installed at the magnet fixing station 11 at regular intervals. In addition, the permanent magnet 12 is installed at the magnet fixing station 11 in a binary pattern in order to discriminate a plurality of predetermined positions from one another. For example, if the permanent magnet 12 is installed at the magnet fixing station 11 in a binary pattern, the permanent magnet 12 generates a magnetic field corresponding to a binary value. Accordingly, the position notifying unit (e.g., first position notifying unit 1) notifies the preset position (e.g. a position of the first position notifying unit 1) and outputs an intrinsic identification (ID), a binary value corresponding to the magnetic field, for discriminating the preset position from other preset positions (e.g., second to fifth position notifying units 2~5). At this time, the control unit can recognize and discriminate the preset position based on the intrinsic identification (ID) (S1). The intrinsic ID means a position signal.

In addition, the position notifying unit 1~5 may be installed at a wall surface. Here, preferably, the position notifying unit (first~fifth position notifying units) is installed at one of two walls which meet each other so that a mobile robot can easily search a position of the position notifying unit (one of the first to fifth position notifying units).

Thereafter, when the mobile robot moves in a cleaning area according to map information preset by an order of a user (S2), the position signal detecting unit 10 detects the position signal (intrinsic ID) and outputs the detected position signal to the control unit (not shown) (S3). Here, preferably, a magnetic sensor 13 is used as the position signal detecting unit 10. A plurality of magnetic sensors 13 installed at the position signal detecting unit 10 detects a magnetic field generated at the permanent magnet 12 included in the position notifying unit 1~5, converts the detected magnetic field into an electrical signal and outputs the electrical signal to the control unit. Here, the magnetic sensor 13 is installed at the mobile robot, corresponding to the permanent field 12 in order to detect a magnetic field generated at the permanent magnet 12.

The control unit (not shown) compares the detected position signal with a pre-stored position signal. If the detected position signal is identical with the pre-stored position signal, the control unit corrects a current position error of the mobile robot based on pre-stored position information corresponding to the identical pre-stored position signal. For example, the control unit converts the electrical signal to a binary value and compares the converted binary value (position signal) with pre-stored binary values (pre-stored position signal). If the converted binary value (position signal) is identical with one of the pre-stored binary values (S4), the control unit corrects a current position of the mobile robot on the basis of position information (e.g., position information of the first position notifying unit 1) corresponding to the identical pre-stored binary value (S5). That is, the control unit of the mobile robot applies the corrected position information to preset map information, thereby moving the mobile robot in the specific area in the same manner as the conventional art. Here, position information of the first to fifth position notifying units is pre-stored at a storing unit (not shown), and the storing unit is installed at the control unit.

Whenever a predetermined time taken to correct a position error of the mobile robot elapses, the control unit of the mobile robot selects the nearest position notifying unit based on the preset map information, and moves the mobile robot along a wall surface. When the mobile robot approaches the selected position notifying unit, the control unit receives a position signal generated from the selected position notifying unit 1~5 to thereby correct a position error of the mobile robot. Here, preferably, when the mobile robot approaches the position notifying unit, a speed of the mobile robot is reduced in order to correctly detect a position signal (magnetic field) generated from the position notifying unit.

As so far described, an apparatus and a method for correcting a position of a mobile robot in accordance with the present invention can correct a position error occurring when a mobile robot moves by installing a plurality of permanent magnets at predetermined positions of a cleaning area in a binary pattern and recognizing and discriminating the predetermined position based on a magnetic field generated at the permanent magnet. That is, the present invention can correctly correct a position error (accumulated position error) generated by sliding of the wheel of the mobile robot or its idle rotation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. An apparatus for correcting a position of a mobile robot comprising:
   a position notifying unit, installed at a predetermined position, that generates a position signal indicative of the predetermined position, wherein the position notifying unit comprises a magnet fixing station affixed to a surface perpendicular to a plane in which a mobile robot moves, the magnet fixing station including at least one magnet which generates a magnetic field having a binary pattern uniquely identifying the predetermined position;
   a position signal detector, installed at a predetermined position of the mobile robot, that detects the position signal; and
   a control unit, installed at a predetermined position of the mobile robot, that corrects a position of the mobile robot on the basis of pre-stored position information corresponding to the detected position signal.

2. The apparatus of claim 1, wherein the control unit corrects a position error that is generated when the mobile robot moves on the basis of pre-stored position information corresponding to a predetermined position.

3. The apparatus of claim 1, wherein the position notifying unit generates a magnetic field corresponding to a binary value in order to discriminate a predetermined position.

4. The apparatus of claim 3, wherein the position signal detector includes magnetic sensors, wherein the magnetic sensors detect a magnetic field corresponding to the binary value and convert the detected magnetic field into an electrical signal.

5. The apparatus of claim 4, wherein the control unit converts the electrical signal to a binary value and corrects a current position of the mobile robot on the basis of pre-stored position information corresponding to a pre-stored binary value when the binary value is identical to the pre-stored binary value.

6. The apparatus of claim 5, wherein the control unit comprises a storing unit that pre-stores the binary value and the position information.

7. The apparatus of claim 1, wherein the control unit corrects current position information of the mobile robot on the basis of position information corresponding to a pre-stored position signal when the position signal is identical to the pre-stored position signal.

8. The apparatus of claim 1, wherein the magnet comprises a permanent magnet.

9. The apparatus of claim 1, wherein the position notifying unit is positioned on a wall.

10. The apparatus of claim 1, wherein the binary pattern is based on an arrangement of the at least one magnet on the magnet fixing station.

11. A method for correcting a position of a mobile robot that moves in a first plane, the method comprising:
    generating, by at least one maonet included in a magnet fixing station installed at a predetermined positionin in a second plane, the second plane being perpendicular to the first plane, a position signal indicative of the predetermined position, wherein the position signal is a magnetic field having a binary pattern uniquely identifying the predetermined position;
    detecting the position signal; and
    correcting a position of the mobile robot on the basis of pre-stored position information corresponding to the detected position signal.

12. The method of claim 11, wherein the correcting comprises correcting a position error generated when the mobile robot moves on the basis of pre-stored position information corresponding to a predetermined position.

13. The method of claim 11, wherein the detecting comprises detecting the magnetic field and converting the detected magnetic field into an electrical signal.

14. The method of claim 13, wherein the correcting comprises converting the electrical signal into a binary value and correcting a current position of the mobile robot on the basis of pre-stored position information corresponding to the pre-stored binary value when the binary value is identical with a pre-stored binary value.

15. The method of claim 11, wherein the correcting comprises correcting the current position information of the mobile robot on the basis of position information corresponding to the pre-stored position signal when the detected position signal is identical to a pre-stored position signal.

16. The method of claim 11, wherein the binary pattern is based on an arrangement of the at least one magnet on the magnet fixing station.

17. A mobile robot, comprising:
    a position signal detector that detects a position signal, indicative of a predetermined position, and generated by a position notifier comprising a magnet fixing station that includes at least one magnet affixed to a surface perpendicular to a plane in which the mobile robot moves; and a controller that corrects a position of the mobile robot on the basis of pre-stored position information corresponding to the detected position signal, wherein the position signal detector comprises at least one magnetic sensor that detects a binary pattern in a magnetic field uniquely identifying a predetermined position, and coverts the detected binary pattern into a binary electrical signal.

18. The mobile robot according to claim 17, wherein the controller converts the electrical signal to a binary value and corrects a current position of the mobile robot on the basis of pre-stored position information corresponding to a pre-stored binary value when the binary value is identical to the pre-stored binary value.

19. The mobile robot according to claim 17, wherein the controller corrects a position error that is generated when the mobile robot moves on the basis of pre-stored position information corresponding to a predetermined position.

20. The mobile robot of claim 17, wherein the binary pattern is based on an arrangement of the at least one magnet on the magnet fixing station.

* * * * *

UNITED STATES PATENT AND TRADEMARK OFFICE
CERTIFICATE OF CORRECTION

PATENT NO. : 7,274,166 B2 Page 1 of 1
APPLICATION NO. : 10/921912
DATED : September 25, 2007
INVENTOR(S) : Young-Gie Kim It is certified that error appears in the above-identified patent and that said Letters Patent is hereby corrected as shown below:

At column 6, line 28 (claim 11), change "maonet" to -- magnet --.

At column 6, line 29 (claim 11), change "positionin" to -- position --.

Signed and Sealed this

Seventeenth Day of June, 2008

JON W. DUDAS
*Director of the United States Patent and Trademark Office*